US008457653B2

(12) United States Patent
Ledlie

(10) Patent No.: US 8,457,653 B2
(45) Date of Patent: Jun. 4, 2013

(54) METHOD AND APPARATUS FOR PRE-FETCHING LOCATION-BASED DATA WHILE MAINTAINING USER PRIVACY

(75) Inventor: Jonathan Ledlie, Cambridge, MA (US)

(73) Assignee: Nokia Corporation, Espoo (FI)

( * ) Notice: Subject to any disclaimer, the term of this patent is extended or adjusted under 35 U.S.C. 154(b) by 108 days.

(21) Appl. No.: 13/035,307

(22) Filed: Feb. 25, 2011

(65) Prior Publication Data
US 2012/0220308 A1 Aug. 30, 2012

(51) Int. Cl.
H04W 24/00 (2009.01)

(52) U.S. Cl.
USPC .......... 455/456.1; 455/414.2; 455/404.2; 455/411; 455/456.3; 455/457

(58) Field of Classification Search
USPC .......... 455/414.2, 404.2, 411, 456.1, 456.3, 455/457
See application file for complete search history.

(56) References Cited

U.S. PATENT DOCUMENTS

| 7,363,041 | B2 | 4/2008 | Bonnard et al. |
| 7,454,196 | B2 | 11/2008 | Kikuta et al. |
| 2003/0187984 | A1 | 10/2003 | Banavar et al. |
| 2006/0080032 | A1 | 4/2006 | Cooper et al. |
| 2008/0140840 | A1* | 6/2008 | Hamilton et al. ............. 709/226 |
| 2009/0312033 | A1* | 12/2009 | Shen et al. .................. 455/456.1 |
| 2010/0151882 | A1* | 6/2010 | Gillies et al. ................ 455/456.1 |
| 2010/0323715 | A1* | 12/2010 | Winters ...................... 455/456.1 |
| 2011/0029670 | A1 | 2/2011 | Klein et al. |

FOREIGN PATENT DOCUMENTS

| EP | 1 271 371 A2 | 1/2003 |
| EP | 2 120 014 A1 | 11/2009 |
| WO | WO 2011/030636 A1 | 3/2011 |
| WO | WO 2011/054912 A1 | 5/2011 |

OTHER PUBLICATIONS

International Search Report for PCT/FI2012/050063 dated May 22, 2012, pp. 1-4.
International Written Report for PCT/FI2012/050063 dated May 22, 2012, pp. 1-8.
U.S. Appl. No. 12/835,611, filed Jul. 13, 2010, Jonathan Ledlie.
U.S. Appl. No. 12/980,864, filed Dec. 29, 2010, Jonathan Ledlie et al.
U.S. Appl. No. 13/028,742, filed Feb. 16, 2011, Jonathan Ledlie et al.
U.S. Appl. No. 61/285,454, filed Dec. 10, 2009, Jun-geun Park et al.
U.S. Appl. No. 61/367,248, filed Jul. 23, 2010, Cynthia Kuo et al.

(Continued)

Primary Examiner — Kwasi Karikari
(74) Attorney, Agent, or Firm — Ditthavong Mori & Steiner P.C.

(57) ABSTRACT

An approach is provided for pre-fetching location-based data while maintaining user privacy. A pre-fetching manager determines to segment a geographical area into a plurality of discrete areas. The pre-fetching manager determines to record location information associated with a device operating within the geographical area. The pre-fetching manager processes and/or facilitates a processing of the location information to calculate occurrence information of the device with respect to the discrete areas. The pre-fetching manager processes and/or facilitates a processing of the occurrence information to select location-based data to cache at the device. The pre-fetching manager further determines one or more other devices based, at least in part, on a collaborative filtering process, and retrieves other occurrence information associated with the one or more other devices, wherein the selection of the location-based data to cache is further based, at least in part, on the other occurrence information.

18 Claims, 10 Drawing Sheets

OTHER PUBLICATIONS

A Long-Duration Study of User-Trained 802.11 Localization, Barry et al., Proc. of Mobile Entity Localization and Tracking in GPS-less Environments (MELT), 2009, pp. 1-17.

bump Technologies, accessed on: Mar. 11, 2011, http://bu.mp/, 1 page.

Employing user feedback for fast, accurate, low-maintenance geolocationing, Bhasker et al., Proceedings of The Second IEEE Annual Conference on Pervasive Computing and Communications (PERCOM'04), pp. 1-10.

Enabling New Mobile Applications with Location Proofs, Saroiu et al., HotMobile 2009, Feb. 23-24, 2009, Santa Cruz, CA, USA, pp. 1-6.

Error Estimation for Indoor 802.11 Location Fingerprinting, Lemelson et al., LoCA 2009, LNCS 5561, Choudhury et al. (Eds.), pp. 138-155.

Improving Location Fingerprinting through Motion Detection and Asynchronous Interval Labeling, Bolliger et al., access on: Mar. 11, 2011, http://www.vs.inf.ethz.ch/publ/papers/bolliger-loca09.pdf, pp. 1-15.

Preserving Privacy in Location-based Mobile Social Applications, Puttaswamy et al., HotMobile'10, Feb. 22-23, 2010, Annapolis, Maryland, pp. 1-6.

Redpin—Adaptive, Zero-Configuration Indoor Localization through User Collaboration, Bollinger, Philipp, MELT'08, Sep. 19, 2008, San Francisco, California, USA, pp. 1-6.

The NearMe Wireless Proximity Server, Krumm et al., UbiComp 2004, The Sixth International Conference on Ubiquitous Computing, Sep. 7-10, 2004, Nottingham, England, pp. 1-18.

Virtual Individual Servers as Privacy-Preserving Proxies for Mobile Devices, Caceres et al. MobiHeld'09, Aug. 17, 2009, Barcelona, Spain., pp. 1-6.

Lien, et al., "An Effective Prefetching Technique for Location-Based Services with PPM," Soochow University, www.atlantis-press.com/php/download_paper.php?id=221, pp. 1-4, 2006.

\* cited by examiner

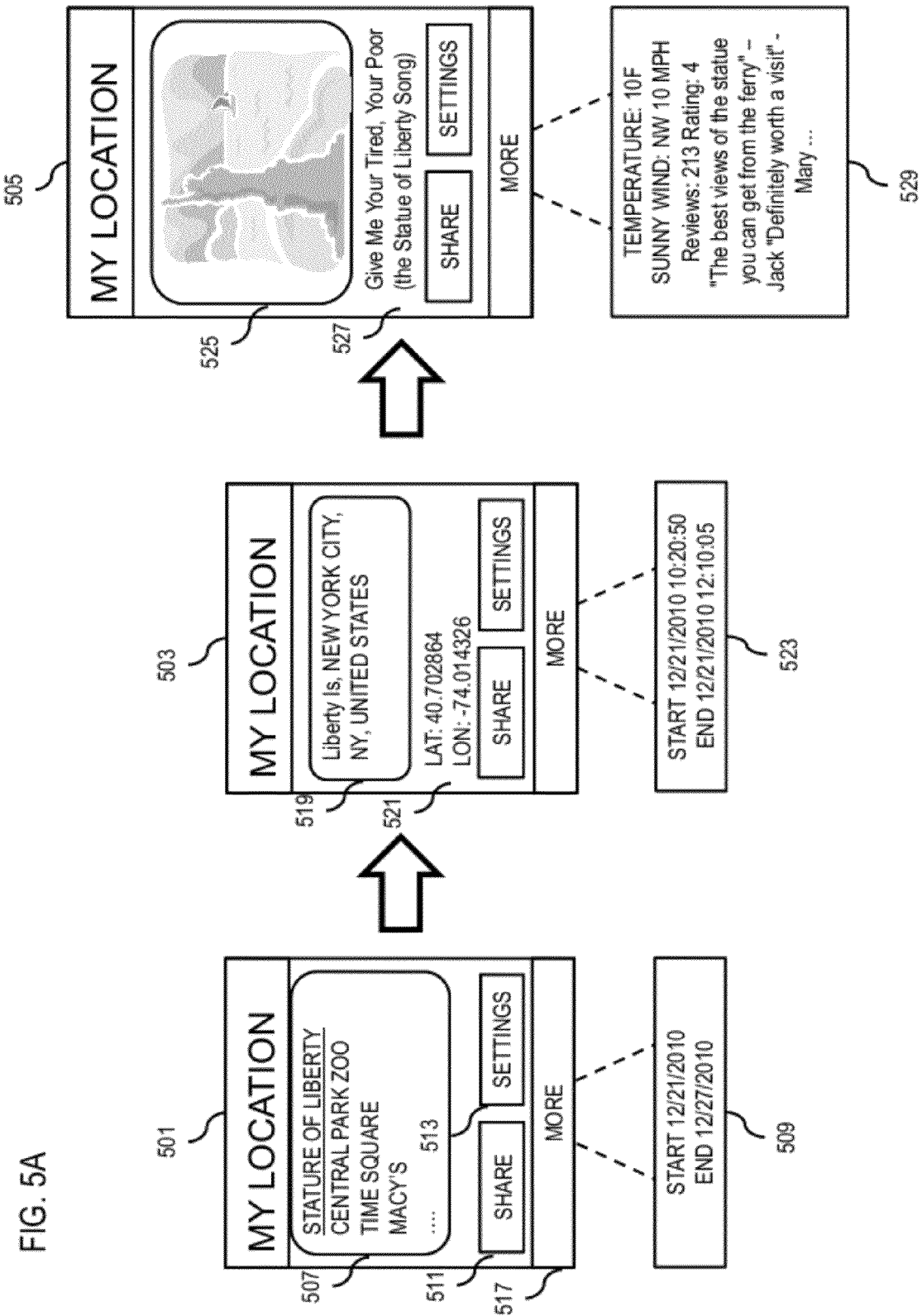

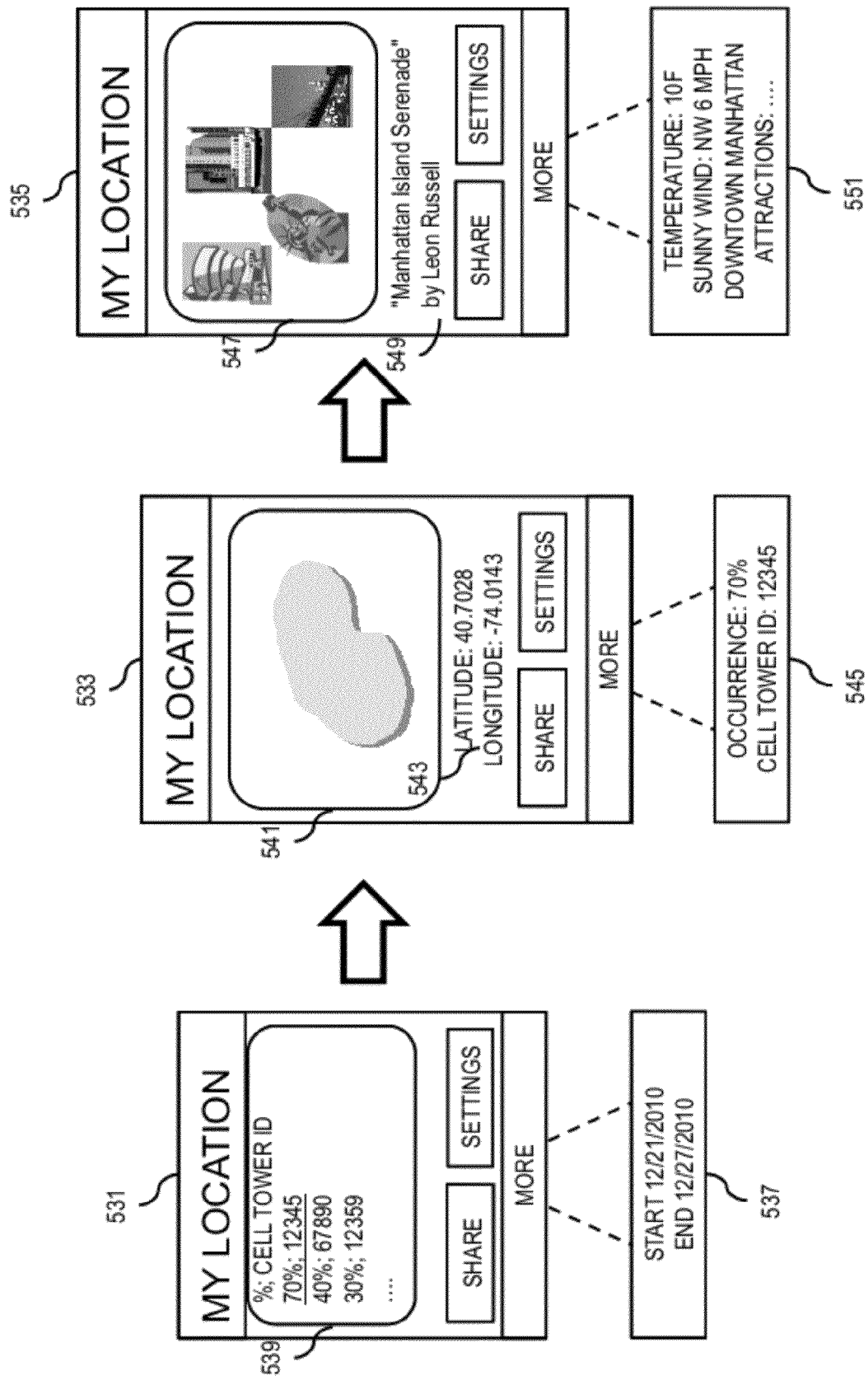

METHOD AND APPARATUS FOR PRE-FETCHING LOCATION-BASED DATA WHILE MAINTAINING USER PRIVACY

BACKGROUND

Service providers and device manufacturers (e.g., wireless, cellular, etc.) are continually challenged to deliver value and convenience to consumers by, for example, providing compelling network services. One area of development has been the use of user location data to provide users with location-based data and services while they are disconnected from communication networks (e.g., offline, bad signal reception, local power outage, etc.). For example, these service providers may collect geographic coordinates of the locations that the user visited to predict the locations that the user will visit in order to transmit location-based data to the user device to cache thereafter for offline use. However, the collected user geographic coordinates and the associated timestamps reveal exactly where and when the user was, thus causes the user great privacy concerns. Accordingly, service providers and device manufacturers face significant technical challenges in providing offline users with location-based data while maintaining user privacy.

SOME EXAMPLE EMBODIMENTS

Therefore, there is a need for an approach for pre-fetching location-based data while maintaining user privacy.

According to one embodiment, a method comprises determining to segment a geographical area into a plurality of discrete areas. The method also comprises determining to record location information associated with a device operating within the geographical area. The method further comprises processing and/or facilitating a processing of the location information to calculate occurrence information of the device with respect to the discrete areas. The method further comprises processing and/or facilitating a processing of the occurrence information to select location-based data to cache at the device.

According to another embodiment, an apparatus comprises at least one processor, and at least one memory including computer program code, the at least one memory and the computer program code configured to, with the at least one processor, cause, at least in part, the apparatus to determine to segment a geographical area into a plurality of discrete areas. The apparatus is also caused to determine to record location information associated with a device operating within the geographical area. The apparatus is further caused to process and/or facilitate a processing of the location information to calculate occurrence information of the device with respect to the discrete areas. The apparatus is further caused to process and/or facilitate a processing of the occurrence information to select location-based data to cache at the device.

According to another embodiment, a computer-readable storage medium carries one or more sequences of one or more instructions which, when executed by one or more processors, cause, at least in part, an apparatus to determine to segment a geographical area into a plurality of discrete areas. The apparatus is also caused to determine to record location information associated with a device operating within the geographical area. The apparatus is further caused to process and/or facilitate a processing of the location information to calculate occurrence information of the device with respect to the discrete areas. The apparatus is further caused to process and/or facilitate a processing of the occurrence information to select location-based data to cache at the device.

According to another embodiment, an apparatus comprises means for determining to segment a geographical area into a plurality of discrete areas. The apparatus also comprises means for determining to record location information associated with a device operating within the geographical area. The apparatus further comprises means for processing and/or facilitating a processing of the location information to calculate occurrence information of the device with respect to the discrete areas. The apparatus further comprises means for processing and/or facilitating a processing of the occurrence information to select location-based data to cache at the device.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: determining one or more other devices based, at least in part, on a collaborative filtering process; and retrieving other occurrence information associated with the one or more other devices, wherein the selection of the location-based data to cache is further based, at least in part, on the other occurrence information. In various example embodiments, the methods (or processes) can be accomplished on the service provider side or on the mobile device side or in any shared way between service provider and mobile device with actions being performed on both sides.

For various example embodiments, the following is applicable: an apparatus comprising means for performing the method of any method claim.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 5A-5C are diagrams of user interfaces utilized in the processes of FIGS. 3-4, according to various embodiments;

DESCRIPTION OF SOME EMBODIMENTS

Figure 1:
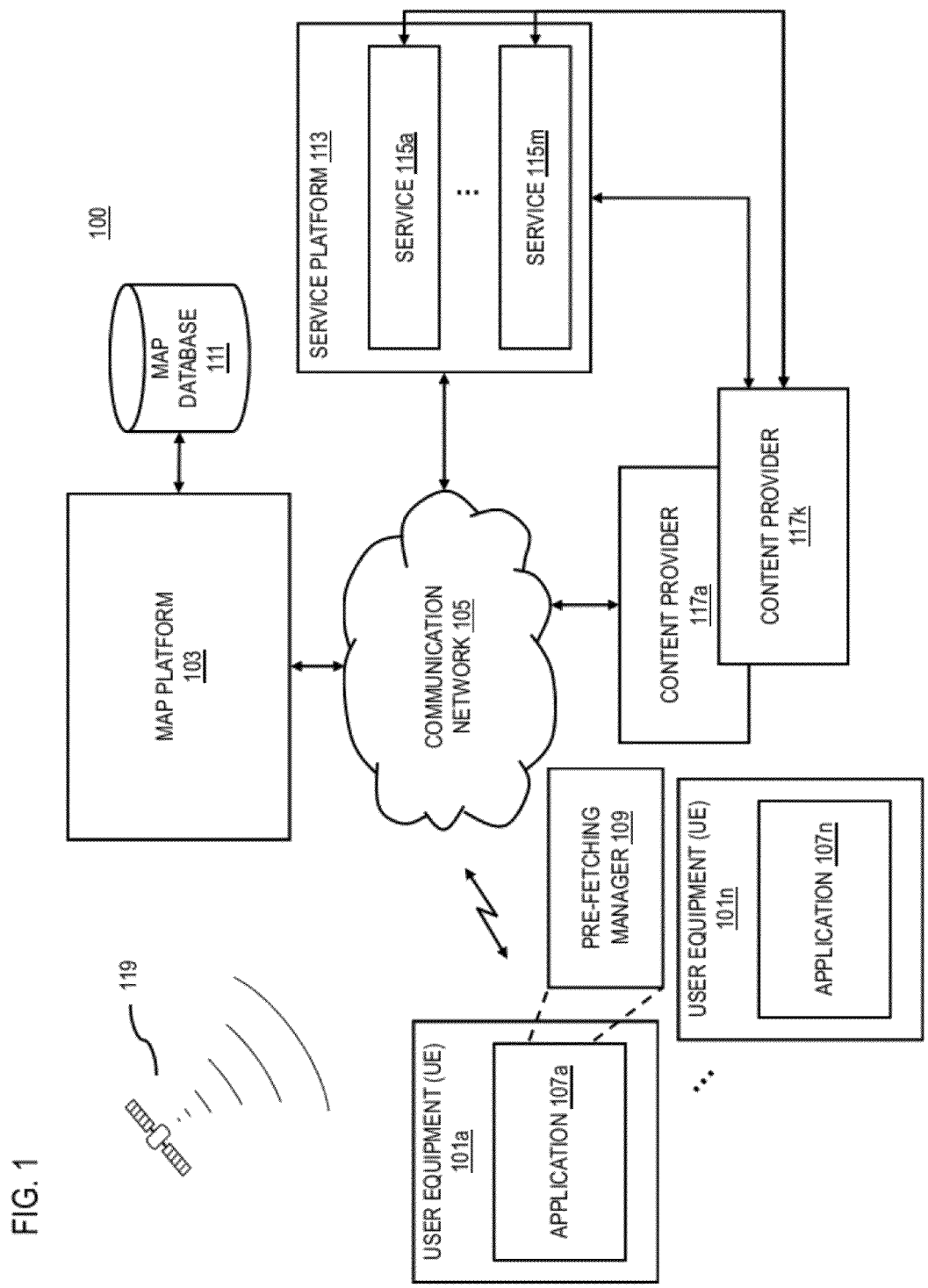
FIG. 1 is a diagram of a system capable of pre-fetching location-based data while maintaining user privacy, according to one embodiment.

Examples of a method, apparatus, and computer program for pre-fetching location-based data while maintaining user privacy are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "location-based service" (LBS) refers to an information service accessible through the network and utilizing the ability to make use of the geographical position of a terminal. Location-based services can be used in a variety of contexts, such as navigation, entertainment, health, work, personal life, etc. Location-based services include services to identify a location of a person or object, such as discovering the nearest banking cash machine or the whereabouts of a friend or employee. Location-based services include location-based commerce (e.g., trade and repair, wholesale, financial, legal, personal services, business services, communications and media,), location-based ecommerce (e.g., online transactions, coupons, marketing, advertising, etc.), accommodation (e.g., hotels, etc.), real estate, renting, construction, dining, transport and travel, travel guides, mapping and navigation, parcel/vehicle tracking, personalized weather services, location-based games, etc.

As used herein, the term "location-based data" refers to (1) data for determining where a user device is, (2) data for rendering a representation of where the user device is (e.g., at a map, etc.), (3) locally relevant content data and event data (items to populate the local map, e.g. Schedules, events), or a combination thereof, to be used to render location based services. The location based data may include images, videos, articles, people, places, etc., associated with a location.

As used herein, the term "user context" refers to discrete context characteristics/data of a user and/or the user terminal/equipment (UE), such as a date, time, location, future activities, current activity, weather, a history of activities, etc. associated with the user. For example, future activities/events may be extracted from a user calendar. In an effort to organize the user context data, a contextual model is inserted with instances, locations (e.g., points of interest), and events (e.g., activities) that contain possible relationships between points of interest and user activities discovered via, for instance, data-mining or other querying processes. By way of example, the contextual model incorporates characteristics and features of an individual user's context data, such as the user's calendar, text messages, instant messages, etc. In another embodiment, user preference data is also merged into the user context model. In particular, the contextual data elements may include location (e.g., where the user/UE is available, wherein the context information source is applicable, etc.), active dates (e.g., the range of dates for which the user/UE and/or the context information source is available), sub-identifiers (e.g., each sub-identifier associated with a different location and/or applicable context information source), event type (e.g., event information associated with the user/UE), time (e.g., of the event if the user/UE involves), applicable context (e.g., in which the context information source is applicable), context source (e.g., what sensors, services, applications, etc. can provide the related contextual information), preference elements (e.g., associated with what preferences data elements), and the like. In yet another embodiment, the user's context may be "binned" into one or more demographic categories. This binning can happen on the user device before location information and/or occurrence information of the device with respect to discrete areas being transmitted to a service platform or server.

In one embodiment, user preferences include both user information and user preference data. Typical user information elements include a user identifier (e.g., telephone number), user device model (e.g., to identify device capabilities), age, nationality, language preferences, interest areas, login credentials (to access the listed information resources of external links). In one embodiment, the preference data is automatically retrieved and/or generated by the system from the backend data and/or external information sources. In another embodiment, the preference data is recorded at the user device based upon user personal data, online interactions and related activities with respect to specific topics, points of interests, or locations, etc. It is contemplated that the user can define any number of preference elements as user preference data. In addition or alternatively, the system decides what parameters or attributes to choose to represent user context and/or preferences.

Although various embodiments are described with respect to pre-fetching location data based upon occurrence information of the device using cell tower coverage areas as discrete area, it is contemplated that the approach described herein is applicable to other granularity of discrete areas, e.g., WiFi media access control (MAC) addresses, and any type of location-based data, including, but not limited to, images, videos, articles, people, places, etc., associated with a location. In certain embodiments, location data at one level of granularity (e.g., GPS location data with precise longitude and latitude information) can be converted or otherwise transformed into location data of another level of granularity (e.g., geo-code location data specific to a city versus specific to a street address).

FIG. 1 is a diagram of a system capable of pre-fetching location-based data while maintaining user privacy, according to one embodiment. It is becoming increasingly popular for service providers and device manufacturers to bundle or make available navigation and mapping services on an array of user devices (e.g., mobile handsets, computers, navigation devices, etc.). Such devices may utilize location-based technologies (e.g., Global Positioning System (GPS) receivers, cellular triangulation, assisted-GPS (A-GPS), etc.) to provide navigation and mapping information. One growing trend is the collection of user location information to provide a user with location-based data when the user device is disconnected from communication networks.

In some cases, mobile devices may be disconnected from the communication networks for long periods of time, but the users still want to use location-based services (LBS) while offline. The mobile devices may be disconnected due to unavailable network connectivity, or by choice to avoid high data connection costs by using LBS, etc. To use LBS offline typically involves determining the device's position and processing location-based data without a data and/or GPS connection. Therefore, the mobile device needs to pre-fetch and cache location-based data, such as location signatures, cell tower positions, etc. The mobile device can then use the cached location-based data to provide services such as sending SMS tagged with the user's approximate location, using transportation (e.g., flights, ferries, railways, buses, etc.) schedules based on where the user device is located, etc.

Conventional approaches collect location information of the user device by recording a continuous log of all of GPS coordinates and/or the cell towers that the user device connected to in conjunction with timestamps). Then, once the user regains an acceptable data connection, new location information will be prefetched, based on the assumption that the user will tend to go back to the same places the user has visited before. However, this approach may be problematic if privacy is a concern. First, this location information reveals exactly where and when the user was. Many users are reluctant to give service providers right to use such kind of private information (e.g., that may be embedded in call data records, CDRs) in exchange for offline location based services. Second, this approach does not include new locations that the user has not yet visited.

To address these problems, a system 100 of FIG. 1 introduces the capability to pre-fetch location-based data while maintaining user privacy by collecting location information of the user device for a predetermined period of time (e.g., a week, month, etc.), calculating coarse location summaries including occurrence information (e.g., a percentage of occurrence during the time period) of a user device with respect to discrete areas, selecting location-based data (e.g., restaurant and relevant reviews) based upon the occurrence information (e.g., how often the user device was sampled as located in a discrete area), and caching the location-based data at the user device for offline use. In one embodiment, "coarse location" refers to location information that is collected at a level of granularity that protects user privacy with respect to determining precisely when and where a particularly user is. Additionally, the discrete areas are segmented from a geographic area to be sufficiently large to preserve the user's privacy. By way of example, a discrete area is a cellular tower coverage area such that the system 100 preserves user privacy by avoiding recording timestamps and specific locations of the user device (e.g., a building, street address, point of interest (POI), such as a restaurant, the Statue of Liberty, room, geographic coordinates, etc.). The discrete areas may be arbitrarily segmented based upon any shape, e.g., square, triangle, polygon, etc. The discrete areas may be in the form of known boundaries such as neighborhoods, cities/towns, counties, states/provinces, countries, etc. or may be defined in regular patterns (e.g., a grid). The predetermined period of time for recording the user's occurrence in the discrete areas may be chosen by the user or by the system 100 based upon the available user device storage, user device movement patterns, user context, user preferences, etc.

In one embodiment, the pre-fetching of the location-based data may occur during an initial use of the device, an activation of the device, a change in an online status of the device, a change in an operator network associated with the device, etc. In another embodiment, the less frequent the user device updates the cached location-based data or the more frequent the user device goes offline, the more user privacy is preserved by the system 100 via the described pre-fetching process. The system 100 can predict the updating or offline frequency by monitoring the user device activities, and optionally using other user context data (e.g., user preferences, user calendar, etc.) for the prediction.

The discrete areas and/or the location information may be manually specified by a user, selected by a user on an interactive map, retrieved from a local/external database, etc. The location information and/or the location-based data can be cached and/or present at the user device, such as on demand, when the user later revisits a discrete area, when the user uses location-based data offline, etc.

In addition, since not every location-based data for the later use of location-based services will be cached by the pre-fetching process (e.g., new locations, user habit changes, user preference changes, etc.), the system 100 also pre-fetches location-based data associated with other user devices owned by the same user (e.g., a personal mobile phone, a work PDA, etc.), and/or devices of other users who have characters similar to the user. Therefore, the system 100 may uses algorithms, such as collaborative filtering, to predict new locations for the user device based on the location information of other user devices.

The pre-fetching process determines some locations for the user's later re-visits thereby providing location-based data and improving caching the location-based data for offline use, in a privacy preserving manner. The system 100 uses coarse-grained location summaries instead of the fine, time stamped location logs, and shares these summaries across users, thereby determining locations that the user has historically most commonly visited, anticipating future locations that are not yet visited by the user, and then pre-fetching or updating location-based data for those locations.

By way of example, a European tourist visiting New York City may turn on a user device, for instance, to take pictures. To save the roaming charge, the tourist defaults the device to an offline mode. As this may be the first time the tourist visits the area, the cache memory of the device may not contain location-based data with respect to the tourist's current location. Nevertheless, because of the tourist's manual selection of New York City, the system 100 pre-fetches location-based data (e.g., roadside cafe reviews, wine testing events, fashion shows, etc.) based on the prediction made with location information and/or location-based data of other like-minded users (e.g., European single females of ages 35-45). The location-based data may be collected from the user devices of European single female expatriates ages 35-45 working in New York City via the above-described pre-fetching process. The system 100 may then transmit the location-based data to the tourist's device for caching.

Even though the discrete areas and the location information collection time period are selected to preserve user privacy, the location-based data may still include any indicator, data, and/or information to identify location characteristics (e.g., nearby POIs) within a discrete area such that the system 100 may present at the user device at any level of granularity. The other considerations for presenting the location-based data include the hardware limitations of the user device, such as the storage capabilities, computation resources, etc. The location-based data may be retrieved from a memory associated with the device (e.g., cached location-based data) for immediate retrieval or from other components of the system 100, for instance, by requesting information from an external database or the cloud. After the retrieval process, the system 100 may transmit the location-based data to the device for current or later use.

As shown in FIG. 1, the system 100 comprises a user equipment (UE) 101 (or UEs 101 or UEs 101a-101n) having connectivity to a map platform 103 via a communication network 105. The location-based data may be utilized by applications 107 of the UE 101 (e.g., location-based applications). The applications 107 may also include or have access to a pre-fetching manager 109 to pre-fetch the location-based data. It is noted that the pre-fetching manager 109 may be included with the UE 101 as shown, or the pre-fetching manager 109 may be provided and handled by the map platform 103. Moreover, location-based data, such as mapping information, may be included in a map database 111 associated with the map platform 103 for access by the applications 107. The mapping information may be retrieved from the map database 111 to be utilized by the applications 107 of the UE 101.

In certain embodiments, mapping information may be associated with content information including live media (e.g., streaming broadcasts), stored media (e.g., stored on a network or locally), metadata associated with media, text information, location-based data of other user devices, or a combination thereof. The content may be provided by the service platform 113 which includes one or more services 115a-115m (e.g., music service, mapping service, video service, social networking service, content broadcasting service, etc.), one or more content providers 117a-117k (e.g., online content retailers, public databases, etc.), other content source available or accessible over the communication network 105. For example, the applications 107 may present location-based data (e.g., content with regard to images, videos, articles, people, places, etc., associated with a location) on a display of the UE 101 in addition or as an alternate to other mapping information.

As mentioned, the UE 101 may utilize location-based technologies (GPS receivers, cellular triangulation, A-GPS, etc.) to provide mapping information. For instance, the UE 101 may include a GPS receiver to obtain geographic coordinates from satellites 119 to determine the current location associated with the UE 101. For example, while inside the airport, the UE 101 may not have GPS satellite reception, and therefore may determine the current location based on, for instance, cell-ID information.

In one sample use case, a tourist lands at the foreign city from a week-long sightseeing trip. Based on the geographic coordinates received from the satellites 119, a particular application 107 will check via the pre-fetching manager 109 whether the location-based data (e.g., restaurant reviews) for the current location is available in the memory of the UE 101. Assuming that the user had previously visited the foreign city, the pre-fetching manager 109 may have assumed that the user would return, for instance, based on calendar entries on the user's UE 101. Thus, in this case, the location-based data of the foreign city or an area within the city will most likely be stored in the memory of the UE 101. As a result, the cached location-based data may immediately be presented to the user offline, reducing the data connection cost. In addition, it is noted that the application may also cache location-based data with regard to the user's home area, or other favorite areas, as those areas may be places that the user frequently visits. As such, a table of discrete areas may be maintained where pre-fetching has already been done. In these discrete areas, the pre-fetching manager 109 may determine to frequently update the location-based data to conserve resources, such as processor availability and battery life.

In another sample use case, the user visits at a foreign city for the first time. In this case, on activation of the UE 101 (e.g., turning on, entering a new cellular network, etc.), the pre-fetching manager 109 obtains location information of users of like-minded from the map platform 111 and/or the service platform 113. Based on the location information, the pre-fetching manager 109 determine one or more discrete areas the UE 101 is likely to go to from the airport and then pre-fetch the corresponding location-based data that might be needed by one or more applications (e.g., application 107) executing on the UE 101. In another embodiment, the pre-fetching manager 109 directly contains the location-based data of the users of like-minded from the map platform 111 and/or the service platform 113.

In addition or alternatively, the pre-fetching manager 109 can use other user context information (e.g., calendar information, search activity at the UE 101, etc.) to determine one or more discrete areas in the foreign city that the user will be travelling to and then begin caching corresponding location-based data at the UE 101 even before the user has arrived at the foreign airport. As with the above example, such determination of one or more discrete areas can advantageously provides the location-based data to the user device to execute the application 107.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In another embodiment, the pre-fetching manager 109 may retrieve and cache location-based data with respect to a plurality of user privacy levels. The plurality of user privacy levels of a user device may, for instance, be associated with respective granularities of the determined discrete areas. By way of example, the desired location-based data may be with respect to a cell tower coverage area. Thus, based on the corresponding privacy level, the retrieval of the location-based data may include, for instance, the country perspective, the state/province perspective, the city/town perspective, the cell tower coverage perspective, etc.

In another embodiment, the pre-fetching manager 109 may receive a request for a portion of the location-based data, wherein the request specifies a determined discrete area of the device. As mentioned, the request may specify the determined discrete area (e.g., a most frequent visited area) through, for instance, a cell tower coverage area. With respect to location-based data, the portion may include "the name of the country", "the names of the country and the state/province", "the names of the country, the state/province, and "the name of the city/town", etc. In a further embodiment, the pre-fetching manager 109 may determine the portion of the location-based data based on the determined discrete area, the privacy level associated with the determined discrete area, or a combination thereof. For example, the country name by itself may be associated with the lowest privacy level of the user device, while the combination of the city/town name, the state/province name, and the country name may be associated with the higher privacy level of the user device.

In another embodiment, the pre-fetching manager 109 may change the privacy level thus changing the associated discrete areas. In one embodiment, the pre-fetching manager 109 may initially set the lowest privacy level thereby setting the discrete area as countries, so the application 107 is executed based on location-based data at the granularity level of country, such as Chinese news, etc. When the pre-fetching manager 109 changes the privacy level to a cell tower coverage area, the application 107 is executed based on location-based data at the granularity level of the cell tower ID, such as Wi-Fi hot spots within the Time Square, etc.

In one embodiment, the pre-fetching manager 109 requests for and caches a portion of the location-based data based on one privacy level (e.g., the country). The other portions of the location-based data associated with other privacy levels (e.g., the city/town, the cell tower, etc.) may not be retrieved, or may be retrieved only at a later time and thus will become available for presentation to the user and/or for executing the application 107. In a further embodiment, the pre-fetching manager 109 may update the portion of the location-based data based on a change of the privacy level.

In another embodiment, the pre-fetching manager 109 may determine occurrence information of the device with respect to the discrete areas based, at least in part, on the frequency of sampling the device occurring within each of the discrete areas. In another embodiment, the pre-fetching manager 109 may determine occurrence information of the device with respect to the discrete areas, based at least in part upon context information associated with the device. The context information associated with the device may include calendar entries, task lists, day planners, user habits, etc. For example, calendar entries may include location information that may be helpful in determining which discrete areas the user device will be on a particular day and time, such as flight or trip information. As such, calendar entries would be useful in determining the occurrence information of the device with respect to the discrete areas. To preserve user privacy, the pre-fetching manager 109 either uses the context information locally, or converts the context information in to a different granularity prior to transmission externally. By way of example, the pre-fetching manager 109 converts the location information in the calendar entries in the granularity of the discrete areas.

In another embodiment, the applications 107 of the UE 101 may include a navigational application. The user may enter a destination address into the navigational application, which may result in the navigational application providing routing instructions to the user. Thus, the pre-fetching manager 109 may utilize the routing instructions to determine the user's planned route of travel. As such, in a further embodiment, the pre-fetching manager 109 may determine the occurrence information of the device with respect to the discrete areas based on the planned route of travel. By utilizing the routing instructions in addition to the speed of travel, the direction of travel, etc., provided, for instance, by the navigational application, the pre-fetching manager 109 may be able to improve the accuracy of its determination as to the occurrence information of the device with respect to the discrete areas.

In another embodiment, the pre-fetching manager 109 may determine an event associated with the device for triggering updating of the cached location-based data. For example, the event may include an initial use of the device, an activation of the device, a change in an online status of the device, a change in an operator network associated with the device, or a combination thereof. The occurrence of such events are relevant to (e.g., to indicate a significant distance movement), for instance, determining the occurrence information of the device with respect to the discrete areas, thereby retrieving the location-based data, and caching the location-based data for current or later use. Using particular events as conditions or triggers to perform steps related to pre-fetching of location-based data (as opposed to periodically or on demand performing such steps) helps the device conserve resources, such as processor availability and battery life.

In another embodiment, the pre-fetching manager 109 may determine one or more location-based applications executing at the device. The one or more location-based applications may include, for instance, a navigational application for route planning, a travel guide application for restaurant reviews, etc. By way of example, the user may utilize the navigational application located on the device to obtain routing information to a desired destination address. While the navigational application is being utilized by the user, it may be able to provide additional information such as the speed of travel, the direction of travel, etc. In one embodiment, the pre-fetching manager 109 may use the routing information, the destination address, the speed of travel, and the direction of travel to improve accuracy of the determination of the occurrence information of the device with respect to the discrete areas. By way of example, the user searches for a route and then caches the destination of the route (e.g., waypoints, names of the places, etc,). The destination can be added to a list of places to be used by the pre-fetching manager 109 to determine the occurrence information of the device with respect to the discrete areas. In addition, the pre-fetching manager 109 may use the routing information and the destination address to determine one or more portions of the location-based data. Accordingly, in a further embodiment, the pre-fetching manager 109 may determine the occurrence information of the device with respect to the discrete areas, at least a portion of the occurrence information, or a combination thereof based on the one or more location-based applications.

In another embodiment, the pre-fetching manager 109 may act on an execution of one or more location-based applications. In yet another embodiment, the pre-fetching manager 109 may determine at least a portion of the occurrence information based on available information regarding a current location of the device. In a further embodiment, the pre-fetching manager 109 may further provide the at least a portion of the occurrence information to the one or more location-based applications.

By way of example, the UE 101, the map platform 103, the service platform 113, and the content providers 117a-117k communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
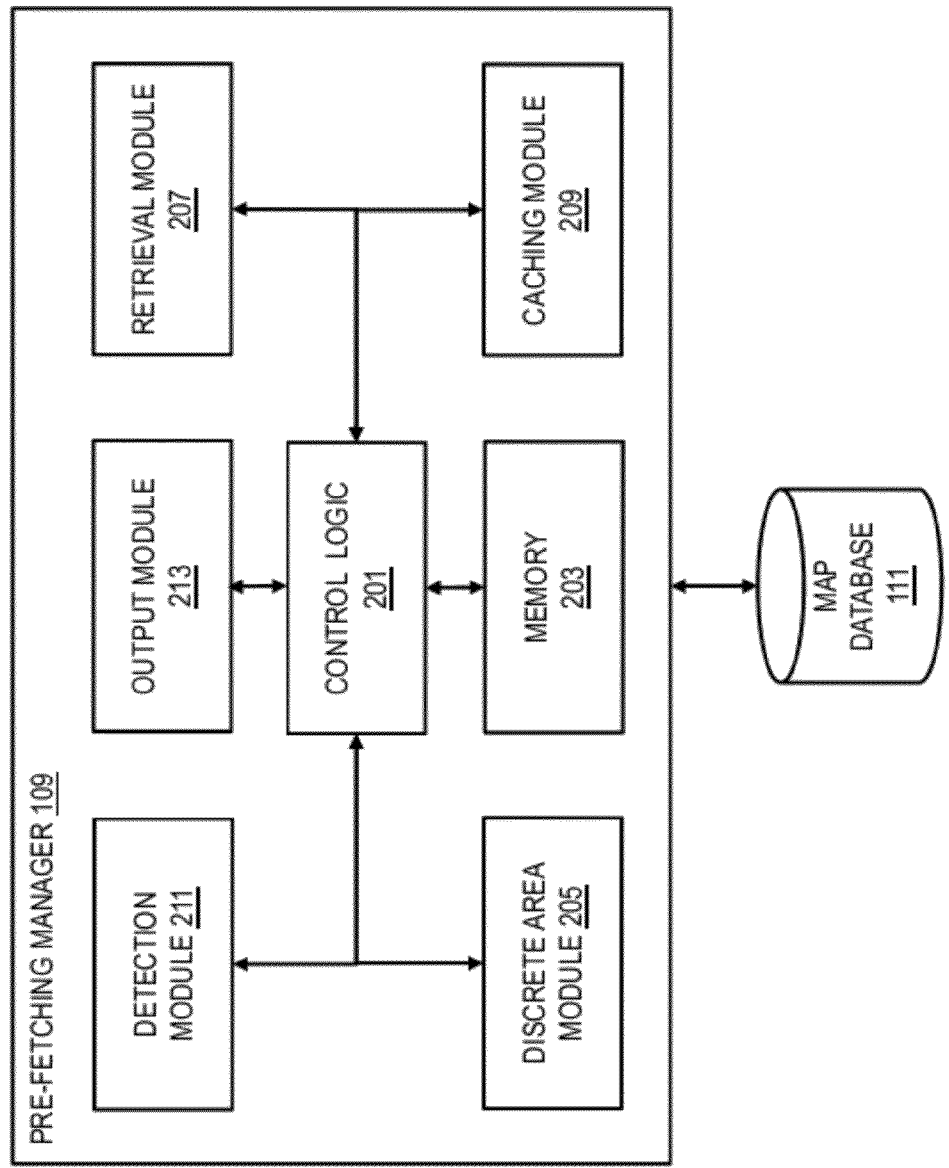
FIG. 2 is a diagram of the components of a pre-fetching manager, according to one embodiment.

FIG. 2 is a diagram of the components of a pre-fetching manager, according to one embodiment. By way of example, the pre-fetching manager 109 includes one or more components for pre-fetching location-based data while maintaining user privacy. It is contemplated that the functions of these components may be combined in one or more components or performed by other components of equivalent functionality. In this embodiment, the pre-fetching manager 109 includes control logic 201, a memory 203, a discrete area module 205, a retrieval module 207, a caching module 209, and a detection module 211.

The control logic 201 oversees tasks, including tasks performed by the discrete area module 205, the retrieval module 207, the caching module 209, and the detection module 211. For example, although the other modules may perform the actual task, the control logic 201 may determine when and how those tasks are performed or otherwise direct the other modules to perform the task.

The discrete area module 205 segments a geographic area to determine the discrete areas associated with the UE 101. In one embodiment, the discrete area module 205 may determine the occurrence information of the device with respect to the discrete areas by periodically sampling the cell towers covering of the UE 101 for a predetermined period of time. In another embodiment, the determination of the occurrence information may be based on information that may be readily available at applications 107 of the UE 101, such as a navigational application. The information that the navigational application may provide include routing information, destination address, speed of travel, direction of travel, etc. The discrete area module 205 may incorporate such information in its determination process to improve the accuracy of the occurrence information.

Moreover, the discrete area module 205 may work with the detection module 211 to determine when the occurrence information should be updated, for instance, in order to conserve resources, such as processor availability and battery life. The detection module 211 may identify whether certain conditions or triggers have been met, such as whether a particular event has occurred (e.g., the movement to another country), before instructing the discrete area module 205 to determine the occurrence information and then update the cached location-based data accordingly. The detection module 211 may also cooperate with the retrieval module 207 and the caching module 209 to determine, for instance, whether the retrieval module 207 or the caching module should act based on the detection of the conditions or triggers.

The retrieval module 207 retrieves location-based data based on the occurrence information, and thus, interacts with the discrete area module 205 to perform such tasks. The retrieval module 207 may obtain the location-based data from the memory 203, the map database 111, or any other components of the system 100. The retrieval module 207 may determine whether to retrieve the location-based data from the memory 203, the map database 111, other components of the system 100, or a combination thereof based on a number of factors, such as whether the location-based data is already cached, the availability of resources, recommendations by the detection module 211, etc.

The caching module 209 caches the location-based data in the memory 203 (or another memory at the UE 101) for current or later use. The caching module 209 may regulate the location-based data that is stored in the memory 203. For example, the caching module 209 may determine the amount of location-based data to be stored, which location-based data should be stored (e.g., depending on frequency, user-defined or automated priority, etc.), the level of granularity required of location-based data before it is stored, etc.

In one embodiment, the output module 213 facilitates a creation and/or a modification of at least one device user interface element, at least one device user interface functionality, or a combination thereof based, at least in part, on information, data, messages, and/or signals resulting from any of the processes and or functions of the pre-fetching manager 109 and/or any of its components or modules. By way of example, a device user interface element can be a display window, a prompt, an icon, and/or any other discrete part of the user interface presented at, for instance, the UE 101. In addition, a device user interface functionality refers to any process, action, task, routine, etc. That supports or is triggered by one or more of the user interface elements. For example, user interface functionality may enable speech to text recognition, haptic feedback, and the like. Moreover, it is contemplated that the output module 213 can operate based at least in part on processes, steps, functions, actions, etc. Taken locally (e.g., local with respect to a UE 101) or remotely (e.g., over another component of the communication network 105 or other means of connectivity).

Figure 3:
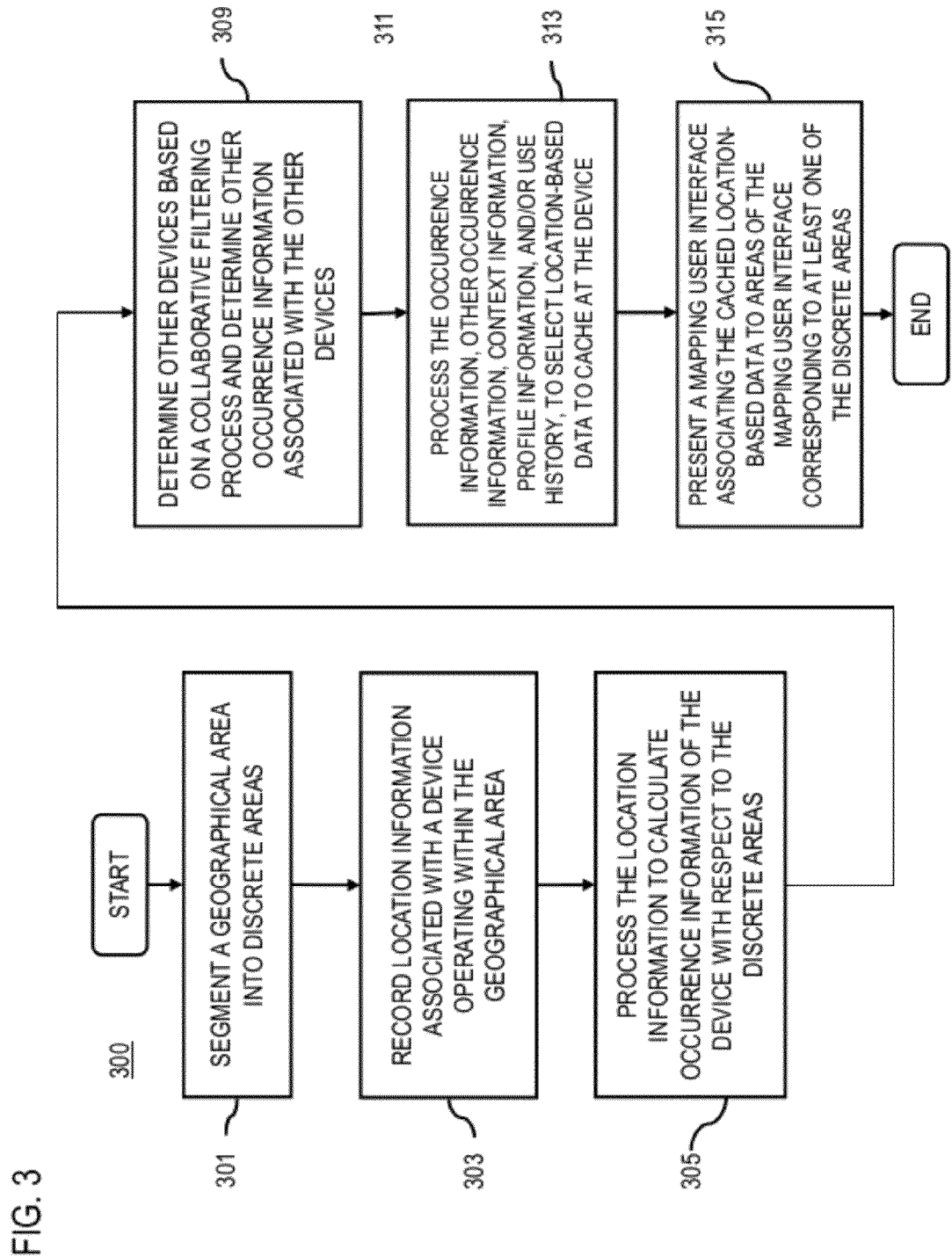
FIG. 3 is a flowchart of a process for pre-fetching location-based data while maintaining user privacy, according to one embodiment.
Figure 7:
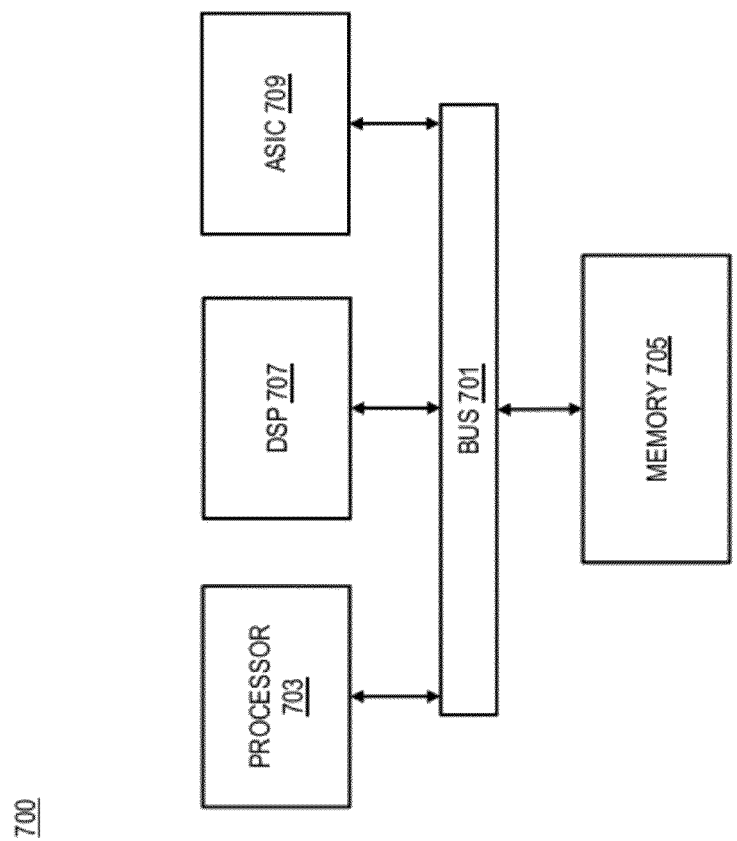
FIG. 7 is a diagram of a chip set that can be used to implement an embodiment of the invention.

FIG. 3 is a flowchart of a process for pre-fetching location-based data while maintaining user privacy, according to one embodiment. In one embodiment, the pre-fetching manager 109 performs the process 300 and is implemented in, for instance, a chip set including a processor and a memory as shown in FIG. 7. As such, the control logic 201 can provide means for accomplishing various parts of the process 300 as well as means for accomplishing other processes in conjunction with other components of the pre-fetching manager 109.

In step 301, the pre-fetching manager 109 determines to segment a geographical area into a plurality of discrete areas (e.g., cell tower coverage areas). A fairly coarse discrete area, such as cell tower coverage areas, are broad enough to cover user privacy while narrow enough to provide customized location based data. In addition, since cell tower IDs are globally unique, the same process could be used across country borders without modification.

The pre-fetching manager 109 also determines to record location information associated with a device operating within the geographical area (Step 303). The location information is recorded over a predetermined period of time.

The pre-fetching manager 109 processes and/or facilitates a processing of the location information to calculate occurrence information of the device with respect to the discrete areas (Step 305). In contrast to the existing approach of fine-grained time-stamped location logs that include a timestamp window and geographic coordinates, the pre-fetching manager 109 generates coarse location summaries that include a list of discrete area IDs (such as cell tower IDs) along with the fraction of time the user device has been in or near each discrete area. Therefore, the information of exact location and time a user was is absent.

The pre-fetching manager 109 determines the one or more other devices based, at least in part, on machine learning techniques (such as a collaborative filtering process) to make comparisons across coarse location summaries from different users. In one embodiment, the pre-fetching manager 109 determines other occurrence information associated with one or more other devices (Step 307). Thus, a user who has similar movement habits to another user will have content prefetched to the user's device for locations the user has not yet been, but is likely to visit in the future. Collaborative filtering (CF) is the process of filtering for information or patterns using techniques involving collaboration among multiple agents, viewpoints, data sources, etc. The system 100 applies collaborative filtering to automatically predict (filter) the user interested geographic areas by collecting location information from many users (collaborating). The underlying assumption of the CF approach is that those who agreed in the past tend to agree again in the future.

The pre-fetching manager 109 determines other occurrence information associated with another predetermined period of time. The pre-fetching manager 109 determines context information, profile information, use history, or a combination thereof associated with the device or a user of the device (Step 309). In addition, as previously mentioned, the occurrence information may be determined based on the current location, information provided by applications 107 of the UE 101 (e.g., navigational applications), conditions or triggering events, locations or context information associated with the device, (e.g., calendar entries), etc.

The pre-fetching manager 109 processes and/or facilitates a processing of the occurrence information, other occurrence information, the context information, profile information, use history, or a combination thereof to select location-based data to cache at the device (Step 311). As described, the location information may include any indicator, data, and/or information to identify characteristics of a current and/or future location of the device such the location-based data that might be used at the device may be pre-fetched or retrieved based on the location information and discrete area. The location-based data may be retrieved from the memory 203 (or other memories at the device), from the map platform 103, or other components of the system 100. If the location-based data is not available in the memory 203, the location-based data may have to be retrieved from the map platform 103 (or the other components). However, even if the memory 203 contains the location-based data, pre-fetching manager 109 may still obtain other location-based data associated with lower granularity levels from the map platform 103.

The pre-fetching manager 109 causes, at least in part, presentation of a mapping user interface associating the cached location-based data to areas of the mapping user interface corresponding to at least one of the discrete areas (Step 313).

The pre-fetching manager 109 processes and/or facilitates a processing of the location information to adjust the granularity of the location information based, at least in part, on the plurality of discrete areas.

A considerable amount of user activities are performed in offline-mode. To ease user interaction with the system by providing location-based data while under the constrains of data storage and computing power, the pre-fetching manager 109 caches only he location-based data with respect to the most prominent discrete area. For example, if the user travels to a new city, the pre-fetching manager 109 extracts location-based data for that particular city to be cached the UE 101 when the user is online for the first time from that city.

Figure 4:
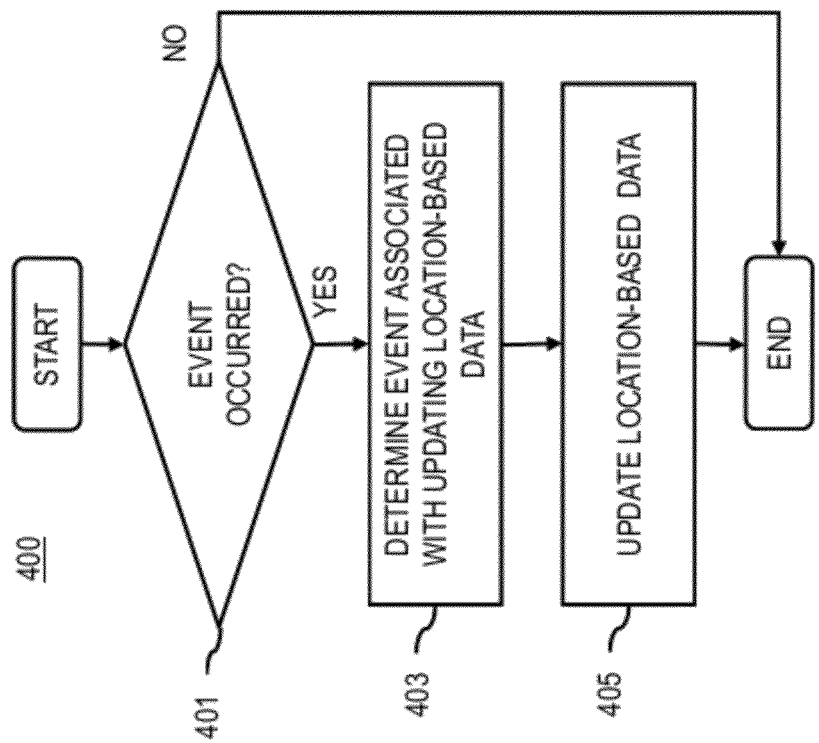
FIG. 4 is a flowchart of a process for updating location-based data, according to one embodiment.

FIG. 4 is a flowchart of a process for updating location-based data, according to one embodiment. In one embodiment, the pre-fetching manager 109 performs the process 400 and is implemented in, for instance, a chip set including a processor and a memory as shown in FIG. 7. As such, the control logic 201 can provide means for accomplishing various parts of the process 400 as well as means for accomplishing other processes in conjunction with other components of the pre-fetching manager 109.

Periodically or from time to time, the user device will connect to a data network to update the cached location-based data. The update can occur without user intervention. For example, the pre-fetching manager 109 detects that the user is connected to a network and automatically starts an update. In step 401, the pre-fetching manager 109 determines whether an event has occurred. If an event has been detected, then pre-fetching manager 109 may then, as in step 403, determine the event associated with the updating location-based data. The event may include an initial use of the device, an activation of the device, a change in an online status of the device, a change in an operator network associated with the device, or a combination thereof.

Depending on the determination of the event, pre-fetching manager 109 may further, as in step 405, determine to cause, at least in part, actions that result in updating the location-based data, based, at least in part, on the event. As discussed, the fact that actions that may result pursuant to step 405 may be conditioned on the occurrence of particular events may help the device conserve resources, such as processor availability and battery life. In another embodiment, a user manually initiates an update and manually selects which location-based data to prefetch. In yet another embodiment, the pre-fetching manager 109 presents to the user a map/list of places to cache, and solicits the user for feedback, e.g., "active feedback." The user feedback is useful information to be fed back into a maximum likelihood (ML) algorithm. The generated results will lead to which places to suggest to other or all users in the future.

The pre-fetching manager 109 causes, at least in part, initiating of caching of the location-based data based, at least in part, on an age of previously cached location-based data or on demand. The pre-fetching manager 109 determines whether the age of the current coarse location summary (including location information and occurrence information) is sufficient to preserve the user's privacy. If summaries are assembled too frequently, the difference between them can show where and when the user has visited in the interim. By way of example, summaries over a week or a month long may be long enough for the comfort of most users. The user can overwrite the cached location-based data. The user could also delay (or discard) the update for greater privacy. If the summary is old enough, the coarse location summary may be processed locally at the user device or sent to a server for further processing. Optionally, the amount of available user device storage for caching location-based data is sent to the server.

The user device or the server then determines which discrete areas the user will likely go to revisit before the next update (i.e., while the device is offline), and what location-based data to be cached at the user device. For example, if the user spends a very large fraction of time in one or more discrete areas, the cache is dedicated to those areas. Alternatively, if the user goes to many discrete areas equally, the cache could be shared equally across those areas. The pre-fetching manager 109 uses the cache for depth (the former) and/or breadth (the latter), to improve location-based data cache hit rates when in an offline mode.

The pre-fetching manager 109 causes, at least in part, a transfer or push of at least a portion of the location information, the occurrence information, or a combination thereof to or from another device associated with a user of the device; and processes and/or facilitates a processing of the transferred information to select location-based data to cache at the device.

The pre-fetching manager 109 or the user can reset the coarse location summary to generate a new one for the next collection period. In another embodiment, the pre-fetching manager 109 uses a rolling window approach to drop location identifiers after a predetermined period of time (e.g., a week). To keep the location-based data from growing too large, its storage could be capped at a maximum number of entries (e.g., 1,000), and dropping location-based data corresponding least frequent discrete areas.

The pre-fetching manager 109 or the user can associate a coarse location summary with a phone number, a subscriber identification module (SIM) card ID, an international mobile subscriber identity (IMSI), an international mobile equipment identity (IMEI), a pseudonym, a random pseudonym, etc. The pre-fetching manager 109 or the user can associate different coarse location summaries with different phone numbers, SIM card IDs, IMSIs, IMEIs, pseudonyms, random pseudonyms, or a combination thereof. By way of example, different coarse location summaries can be collected per user (e.g., Jack, Mary, etc.), per user device (e.g., Jack's work PDA, Jack's personal mobile phone, etc.), per location (e.g., New York, Paris, etc.), per time period (e.g., February, March, etc.), etc., or a combination thereof.

Figure 5C:
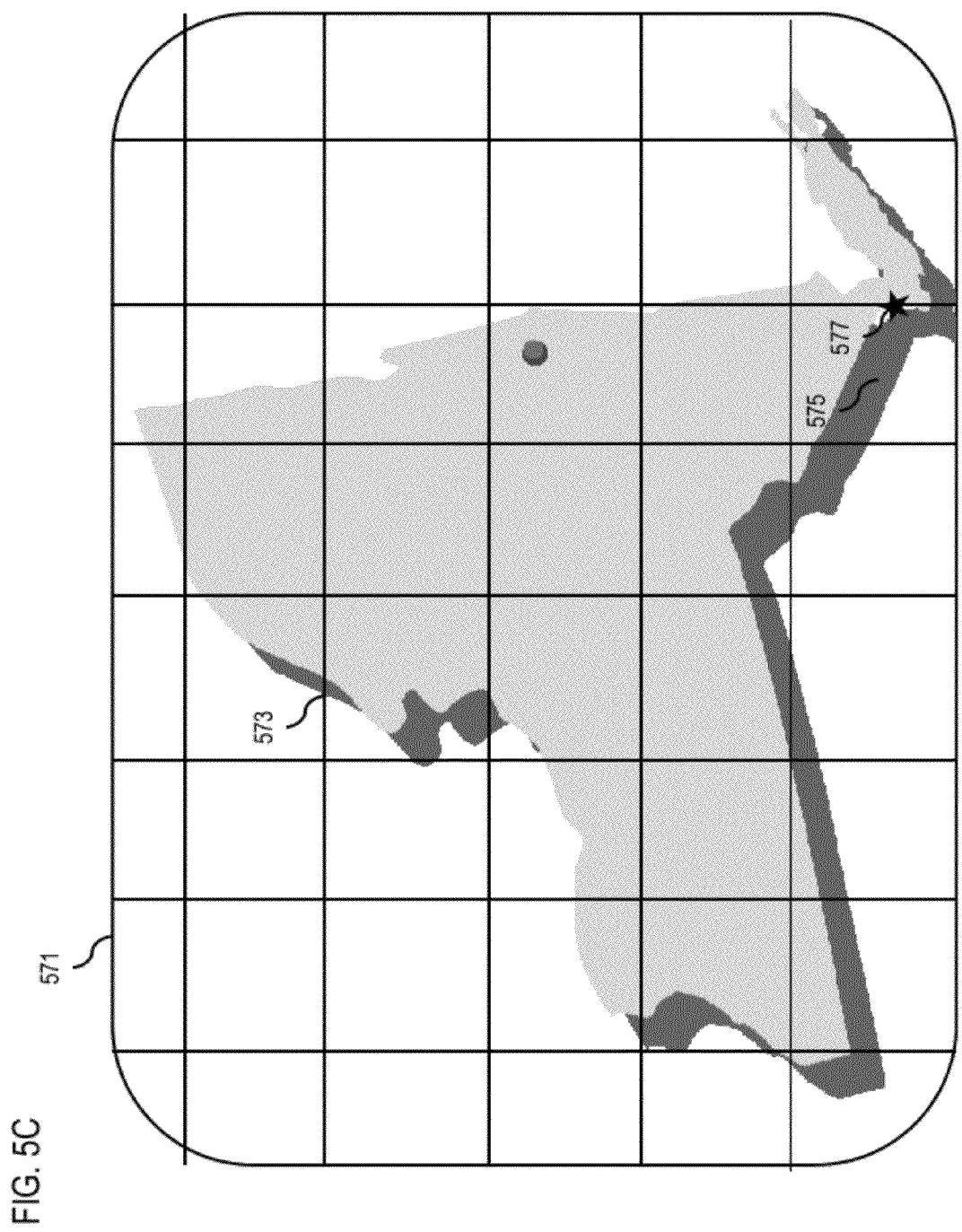

FIGS. 5A-5C are diagrams of user interfaces utilized in the processes of FIGS. 3-4, according to various embodiments. As shown, the example user interfaces of FIGS. 5A-5C include one or more user interface elements and/or functionalities created and/or modified based, at least in part, on information, data, and/or signals resulting from any of the processes (e.g., process 300 and process 400) described with respect to FIGS. 3 and 4.

More specifically, FIG. 5A illustrates three user interfaces (e.g., interfaces 501, 503, and 505) and determined locations expressed as points of interest and geographic coordinates according to the existing approach as discussed previously. The user interface 501 includes a list of points of interests that the user devices visited (e.g., Statue of Liberty, Central Park Zoo, Times Square, Macy's Department Store, etc) shown in a box 507 during the week from Dec. 21, 2010 to Dec. 27, 2010 shown in a box 509. In each user interface, the user has the option to share the displayed information with one or more other user devices by selecting "Share" 511, to change the settings associated with the particular application by selecting "Settings" 513, and to retrieve more information by selecting "More" 515.

When the user selects a point of interest to view more information (e.g., the Statue of Liberty as highlighted with an underline in the user interface 501), the user interface 503 shows the detailed information of the user device's visit of the Statue of Liberty. The detailed information includes the street address (e.g., Liberty Island, N.Y. City, N.Y., United States) in a box 519, the geographic coordinates of the Statute of Liberty in decimal format [40.702864, −74.014326] at item 521, and the visiting time period (start Dec. 21, 2010 10:20:50, end Dec. 21, 2010 12:10:05) in a box 523. The collection and distribution of such detailed information cause user privacy concern, although the user may obtain more detailed location-based data and service. By way of example, the user interface 505 presents the following location-base data of "Statute of Liberty" at the user's device. The image of the Stature of Liberty is shown in a box 525, a title of a location related song (e.g., "Give Me Your Tired, Your Poor (the Statue of Liberty Song)") is displayed in a box 527 while being played at the user device, and weather and attractions information (e.g., Temperature: 10 f; Sunny; Wind: NW 10 MPH; Reviews: 213; Rating: 4; "The best views of the statue you can get from the ferry"—Jack "Definitely worth a visit"—Mary . . . ) is shown in a box 529, etc. The more detailed the cached location-based data is, the more storage at the user device it occupies.

FIG. 5B illustrates three user interfaces (e.g., interfaces 531, 533, and 535), according to one embodiment. Referring back to the example of the European tourist visiting the New York City for the first time, the user device does not contain location-base data of the New York City. Nevertheless, because of the tourist's manual selection of New York City, the system 100 pre-fetches location-based data (e.g., roadside cafe reviews, wine testing events, fashion shows, etc.) based on the prediction made with location information of other like-minded users (e.g., European single females of ages 35-45). The location-based data may be collected from users of like-mind (e.g., European single female tourists of ages 35-45 visited/visiting in New York, European single female expatriates of ages 35-45 worked/working in New York, etc.) via the above-described pre-fetching process.

The user interface 531 of the device shows a location information collection period from Dec. 21, 2010 to Dec. 27, 2010 in a box 537, the occurrence information of several cell towers of ID numbers 12345, 67890, 12389, as 70%, 40%, 30%, in a box 539. As sampled by the system 100, the device was detected as appearing within the cell tower 12345's coverage 70% of the times during that particular week in December 2010. Since the device may be covered by one or more cell towers at the same time (e.g., riding in a vehicle, etc.), the accumulated percentages of the cell towers can exceed 100%. The system 100 may decide to cache location-based data associated with the top one or more cell towers. The cache memory of the device may contain location-based data of either the cell tower ID 12345, or "downtown Manhattan, NYC, US", or "New York, United States."

When the user or the system 100 selects the most prominent cell ID (e.g., an ID 12345) to view the detailed information (e.g., as highlighted with an underline in the user interface 531), the user interface 533 shows the details of the cell tower information. A graphic of the cell tower with an ID 12345 is shown in a box 541, the geographic coordinates of the center of the cell tower in decimal format [40.7028, −74.0143] are shown in a box 543, and the occurrence percentage of 70% and the cell tower ID of 12345 are shown in a box 545.

After the one-week data collection period, since the most prominent cell ID is ID 12345 (e.g., the cell ID in which the user has occurred most often over the data collection period), the device can use cached location-based data of "New York, United States," "downtown Manhattan, NYC, US", or the cell tower ID 12345. By way of example, as shown in the user interface 535, the location-base data of "downtown Manhattan, NYC, US" are presented to at the expatriate's device. The location-based data includes attraction images (e.g., the Guggenheim Museum, the Stature of Liberty, the South Street Seaport, the Brookline Bridge) in a box 547, a title of a location related song (e.g., "Manhattan Island Serenade" by Leon Russell) in a box 549, weather and attractions information (e.g., Temperature: 10 F, Sunny; Wind: NW 6 MPH; Downtown Manhattan Attractions: . . . ) in a box 551. The pre-fetching processing of the device was made according to the pre-fetching process without recording timestamps and geographic coordinates (e.g., [40.702864, −74.014326]) of the expatriate's device. As mentioned, the location information and/or the location-based data of the user can be made available to the tourist when the tourist arrives in New York for the first time. In some embodiments, all or a portion of the location information and/or location-based data of the expatriate and the tourist can be cached for future use by the expatriate, the tourist, and other users. In another embodiment, the whole pre-fetching process is automatic such that nothing presented at the user interface of the user device. Whatever location-based data suggested by the system 100 is cached at the user device 101 automatically.

FIG. 5C illustrates a user interface of a geographic area segmented into discrete areas, according to one embodiment. The user interface 571 expresses a grid dividing the New York state 573 into a plurality of discrete areas of the same shape (e.g., square). One discrete area 575 contains the user's current location 577 marked with a star sign (e.g., obtained through a GPS receiver in geographic coordinates in decimal format, [40.702864, −74.014326]). As shown in interface 571, the geographic area with respect to discrete areas for caching location-based data for the user device is the New York State. In conjunction with the user interface 571, the user has the option to change the settings associated with the geographic area (e.g., from the New York State to Paris), the shape of the discrete areas (e.g., from square to triangle), and a particular application and/or location-base service (e.g., from restaurant reviews to hotel ranking) using the location-base data, and to confirm the selections by clicking "Done". Moreover, the user has the ability to share the user's location information and/or location-based data with other users online.

The above-described embodiments collects location information results over a time period (e.g., a week) and expresses only the fraction of time (rather than time-stamps) where and when a user has been, to make location-based data available offline while preserving user privacy. In addition, the above-described embodiments consume less memory and battery power. The above-described embodiments include location-based data of new locations that the user has not yet been. The above-described embodiments also include collection of coarse location summaries over different service providers.

The processes described herein for pre-fetching location-based data while maintaining user privacy may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
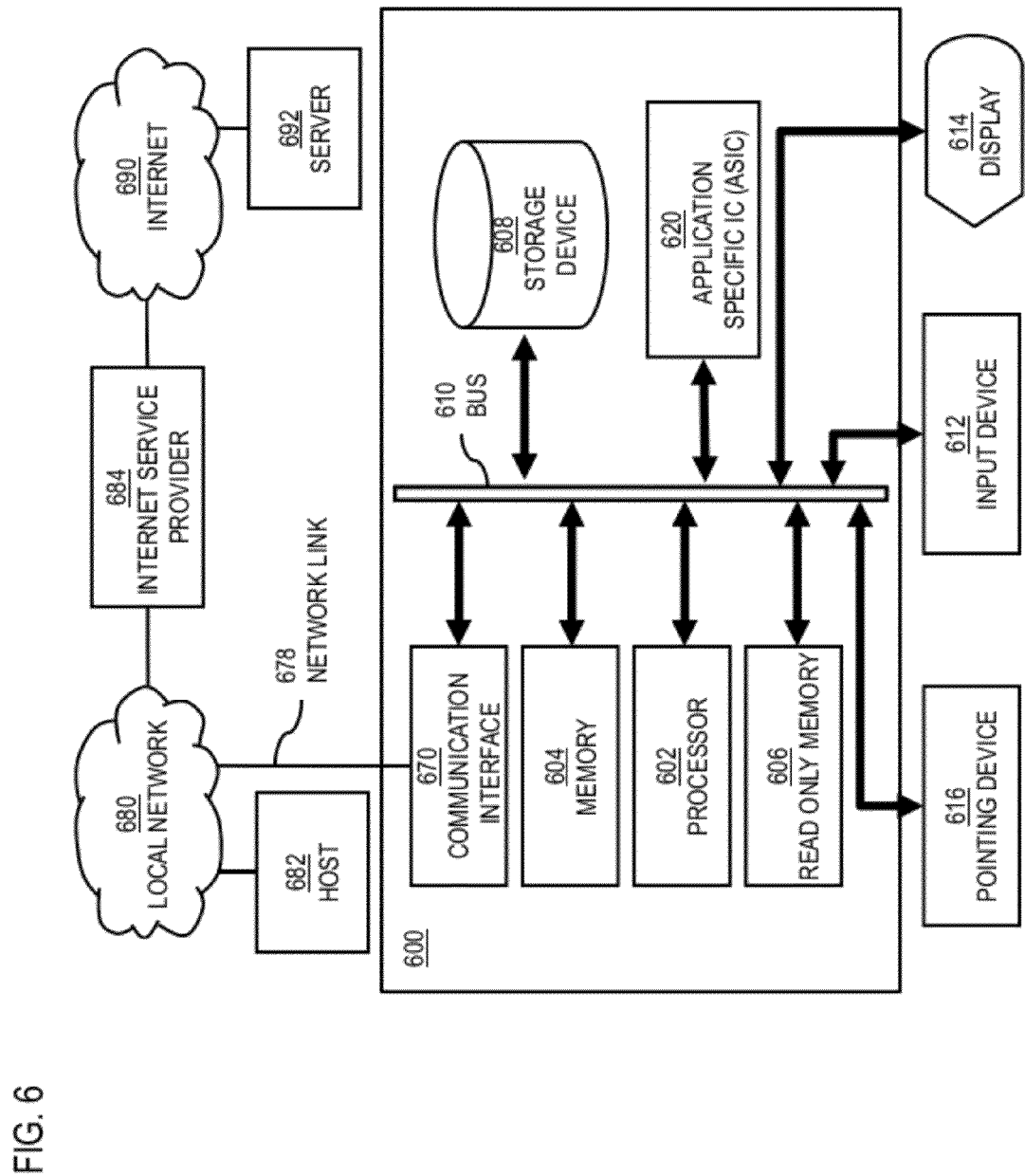
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to pre-fetch location-based data while maintaining user privacy as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of pre-fetching location-based data while maintaining user privacy.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to pre-fetch location-based data while maintaining user privacy. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or any other dynamic storage device, stores information including processor instructions for pre-fetching location-based data while maintaining user privacy. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or any other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for pre-fetching location-based data while maintaining user privacy, is provided to the bus 610 for use by the processor from an external input device 612, such as a keyboard containing alphanumeric keys operated by a human user, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT), a liquid crystal display (LCD), a light emitting diode (LED) display, an organic LED (OLED) display, a plasma screen, or a printer for presenting text or images, and a pointing device 616, such as a mouse, a trackball, cursor direction keys, or a motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of ASICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for pre-fetching location-based data to the UE 101 while maintaining user privacy.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or any other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chip set or chip 700 upon which an embodiment of the invention may be implemented. Chip set 700 is programmed to pre-fetch location-based data while maintaining user privacy as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of functions. Chip set or chip 700, or a portion thereof, constitutes a means for performing one or more steps of pre-fetching location-based data while maintaining user privacy.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to pre-fetch location-based data while maintaining user privacy. The memory 705 also stores the data associated with or generated by the execution of the inventive steps.

Figure 8:
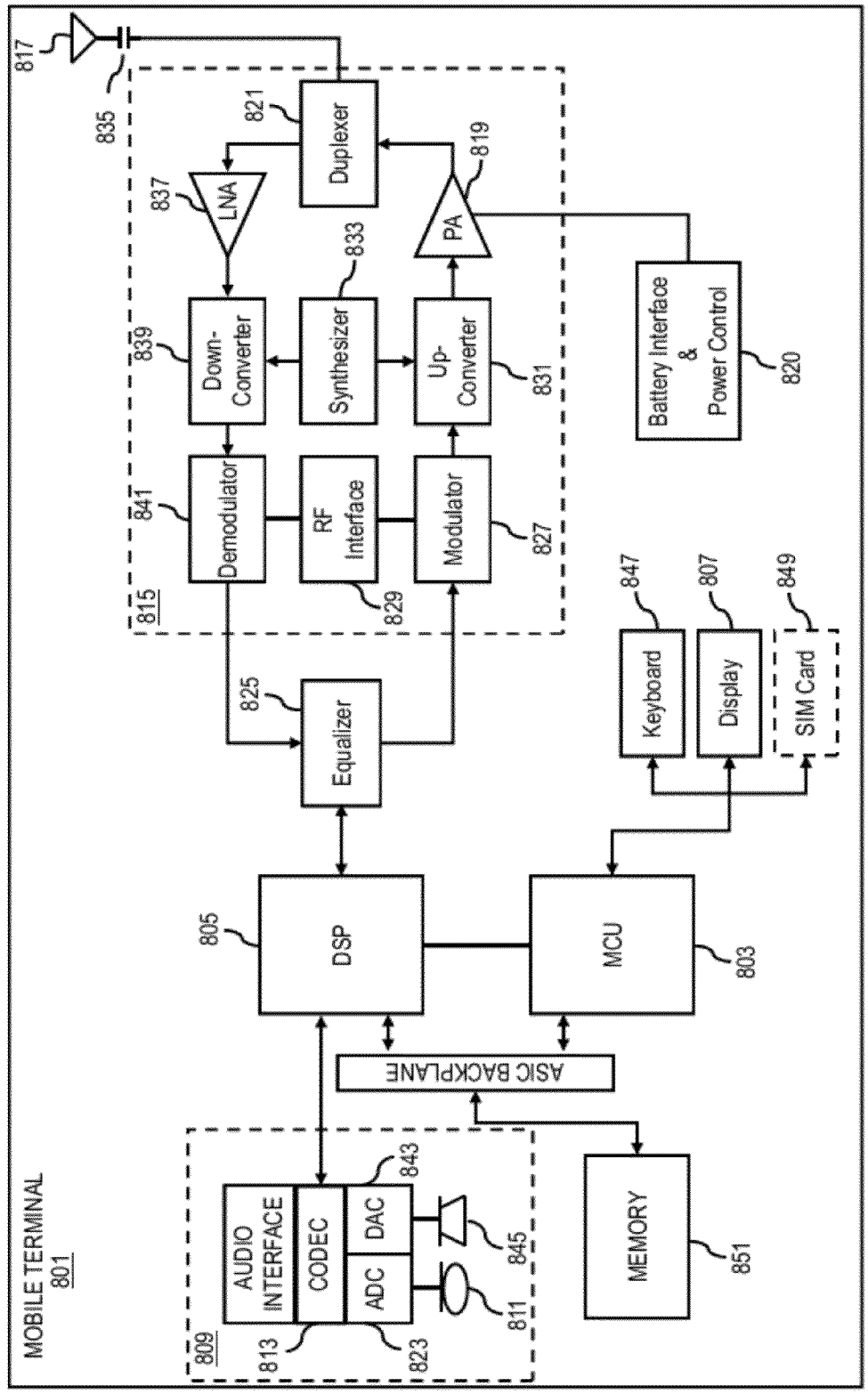
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 801, or a portion thereof, constitutes a means for performing one or more steps of pre-fetching location-based data while maintaining user privacy. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of pre-fetching location-based data while maintaining user privacy. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803 which can be implemented as a Central Processing Unit (CPU) (not shown).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to pre-fetch location-based data while maintaining user privacy. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising processing or facilitating a processing of (1) data, (2) information, or (3) at least one signal, or any combination thereof, based, at least in part, on the following:
   at least one determination to segment a geographical area into a plurality of discrete areas;
   at least one determination to record location information associated with a device operating within the geographical area;
   a processing of the location information to calculate occurrence information of the device with respect to the discrete areas;
   a processing of the occurrence information to select location-based data to cache at the device; and
   wherein the processing of the location information further includes adjusting the granularity of the location information based, at least in part, on the plurality of discrete areas, to protect privacy of a user of the device with respect to determining precisely when and where the user of the device is, and
   wherein the granularity of the location information is adjustable from identification of a precise location within one of the plurality of discrete areas that the device is operating to identification of the geographical area that the device is operating within.

2. The method of claim 1, wherein the location information is recorded over a predetermined or variable period of time.

3. The method of claim 2, wherein the (1) data and/or (2) information and/or (3) at least one signal are further based, at least in part, on the following:
   other occurrence information associated with another predetermined period of time,
   wherein the selection of the location-based data to cache is further based, at least in part, on the other occurrence information.

4. The method of claim 1, wherein the (1) data and/or (2) information and/or (3) at least one signal are further based, at least in part, on the following:
   other occurrence information associated with one or more other devices,
   wherein the selection of the location-based data to cache is further based, at least in part, on the other occurrence information.

5. The method of claim 1, wherein the (1) data and/or (2) information and/or (3) at least one signal are further based, at least in part, on the following:
   at least one determination of the one or more other devices based, at least in part, on a collaborative filtering process, other means of deriving location preferences based at least in part on user behavior, or a combination thereof.

6. The method of claim 1, wherein the (1) data and/or (2) information and/or (3) at least one signal are further based, at least in part, on the following:
   a caching of the location-based data based, at least in part, on an age of previously cached location-based data or on demand.

7. The method of claim 1, wherein the (1) data and/or (2) information and/or (3) at least one signal are further based, at least in part, on the following:
   a presentation of a mapping user interface associating the cached location-based data to areas of the mapping user interface corresponding to at least one of the discrete areas.

8. The method of claim 1, wherein the (1) data and/or (2) information and/or (3) at least one signal are further based, at least in part, on the following:
   context information, profile information, use history, or a combination thereof associated with the device or a user of the device,
   wherein the selection of the location-based data to cache is further based, at least in part, on the context information, profile information, use history, or a combination thereof.

9. The method of claim 1, wherein the (1) data and/or (2) information and/or (3) at least one signal are further based, at least in part, on the following:
   a transfer of at least a portion of the location information, the occurrence information, or a combination thereof to another device associated with a user of the device; and
   a processing of the transferred information to select location-based data to cache at the device.

10. An apparatus comprising:
    at least one processor; and
    at least one memory including computer program code for one or more programs,
    the at least one memory and the computer program code configured to, with the at least one processor, cause the apparatus to perform at least the following,
    determine to segment a geographical area into a plurality of discrete areas;
    determine to record location information associated with a device operating within the geographical area;

process and/or facilitate a processing of the location information to calculate occurrence information of the device with respect to the discrete areas;

process and/or facilitate a processing of the occurrence information to select location-based data to cache at the device; and wherein the processing of the location information further includes adjusting the granularity of the location information based, at least in part, on the plurality of discrete areas, to protect privacy of a user of the device with respect to determining precisely when and where the user of the device is, and wherein the granularity of the location information is adjustable from identification of a precise location within one of the plurality of discrete areas that the device is operating to identification of the geographical area that the device is operating within.

11. The apparatus of claim 10, wherein the location information is recorded over a predetermined or variable period of time.

12. The apparatus of claim 11, wherein the apparatus is further caused to:

determine other occurrence information associated with another predetermined period of time, wherein the selection of the location-based data to cache is further based, at least in part, on the other occurrence information.

13. The apparatus of claim 10, wherein the apparatus is further caused to:

determine other occurrence information associated with one or more other devices, wherein the selection of the location-based data to cache is further based, at least in part, on the other occurrence information.

14. The apparatus of claim 10, wherein the apparatus is further caused to:

determine the one or more other devices based, at least in part, on a collaborative filtering process, other means of deriving location preferences based at least in part on user behavior, or a combination thereof.

15. The apparatus of claim 10, wherein the apparatus is further caused to:

cause, at least in part, initiating of caching of the location-based data based, at least in part, on an age of previously cached location-based data or on demand.

16. The apparatus of claim 10, wherein the apparatus is further caused to:

cause, at least in part, presentation of a mapping user interface associating the cached location-based data to areas of the mapping user interface corresponding to at least one of the discrete areas.

17. The apparatus of claim 10, wherein the apparatus is further caused to:

determine context information, profile information, use history, or a combination thereof associated with the device or a user of the device, wherein the selection of the location-based data to cache is further based, at least in part, on the context information, profile information, use history, or a combination thereof.

18. The apparatus of claim 10, wherein the apparatus is further caused to:

cause, at least in part, a transfer of at least a portion of the location information, the occurrence information, or a combination thereof to another device associated with a user of the device; and process and/or facilitate a processing of the transferred information to select location-based data to cache at the device.

* * * * *